United States Patent [19]

Yamada et al.

[11] Patent Number: 4,596,497

[45] Date of Patent: Jun. 24, 1986

[54] POWDER DISPERSER

[75] Inventors: Yukiyoshi Yamada; Shin Doi, both of Saitama; Masayuki Yasuguchi, Kanagawa, all of Japan

[73] Assignees: Nisshin Flour Milling Co., Ltd.; Nisshin Engineering Co., Ltd., both of Tokyo, Japan

[21] Appl. No.: 606,463

[22] Filed: May 3, 1984

[30] Foreign Application Priority Data

May 18, 1983 [JP] Japan ............................ 58-87328

[51] Int. Cl.[4] ............................................ B65G 53/42
[52] U.S. Cl. ................................... 406/144; 209/3; 209/250; 406/194
[58] Field of Search ................... 406/153, 144, 93-95, 406/194; 209/3, 250

[56] References Cited

U.S. PATENT DOCUMENTS

| 2,315,079 | 3/1943 | Reeves | 406/93 X |
| 2,624,517 | 1/1953 | Smith | 209/250 X |
| 2,982,082 | 5/1961 | Pool | 406/194 X |

FOREIGN PATENT DOCUMENTS

| 315212 | 10/1919 | Fed. Rep. of Germany | 406/153 |
| 320391 | 10/1929 | United Kingdom | 406/144 |

Primary Examiner—Jeffrey V. Nase
Attorney, Agent, or Firm—Wenderoth, Lind & Ponack

[57] ABSTRACT

A powder disperser comprises a nozzle having a narrow discharge port for discharging a powder. A high speed air flow discharge port forms a narrow air port encompassing the outer circumference of the discharge port of the nozzle and is inwardly slanting at an acute angle relative to the discharge direction of a powder flow from the nozzle. A powder dispersing passage is narrowly formed on the downstream side of the nozzle in a circular tube like shape or in a radial shape along the outer wall surface continuing from the outer wall of the high speed air flow discharge port. The powder discharge passage is connected to the powder supply port of a classifier located downstream next to the disperser.

1

POWDER DISPERSER

BACKGROUND OF THE INVENTION

1. Field of the Invention:

This invention relates to a powder disperser for dispersing a powder before the powder is supplied to a classifier.

2. Description of the Prior Art:

It has been known that the factors determinant of the classifying performance of an air classifier generally include the degree of dispersion of the powder within an air flow carrying the powder to the classifier. If the degree of dispersion of powder particles within an air flow is low and the powder comes into classifying chambers in a partially coagulative state, the coagulative particles are classified as coarse particles and are naturally included in a coarse powder. In cases where a fine powder is to be regarded as a classified product, the yield of the operation decreases. If, conversely, the coarse powder is to be regarded as the product, the product has a fine powder mixed therein.

In view of these facts, a classifier is generally provided with a powder dispersing mechanism which is disposed at a stage before the classifying chambers thereof.

However, where the material to be classified is a sticky or coagulant powder, the capacity of the dispersing mechanism within the classifier is sometimes insufficient. For example, in case that the powder includes ultra-fine powder measuring less than 1 μm in a ratio exceeding 50% by weight, the adhesiveness and coagulation of powder suddenly increase to lower the yield and tend to choke up a supply port, etc. of the classifier. To avoid such trouble, it is conceivable to separately provide a disperser at a stage before the classifier for dispersing the powder to increase the degree of dispersion of the powder before it is supplied to the classifier.

FIG. 1 of the accompanying drawings schematically shows by way of example the whole flow of the operation of an air classifying system in which a disperser is arranged in a manner as mentioned above. Referring to FIG. 1, a powder to be processed is supplied from a feeder 1 to a classifier 3 via a disperser 2. A coarse powder portion 5 of the powder is recovered via a rotary valve 4. A fine powder portion 7 is recovered via a bag filter 6. A blower 8 is arranged to keep the air passing through the classifier 3 by suction.

The disperser 2 shown in FIG. 1 functions as a pretreatment device for the classifier 3. However, mere use of the conventionally known mechanical type disperser does not sufficiently meet the requirement for an improved degree of dispersion. The first reason for this insufficiency is as follows: In the case of a disperser 2 using stirring blades, the length of a passage between the disperser 2 and the classifier 3 inevitably increases to a certain extent. Then, recoagulation takes place in the passage to lower the degree of dispersion attained. The second reason resides in that, in order to attain a sufficient degree of dispersion, the powder to be processed must be in a thin state within an air flow. Besides, if it is not thin, sticking of powder to the wall surface of the disperser 2 would impede a continuous operation of the disperser 2 and eventually that of the classifier 3. It is another disadvantage of the mechanical type that the size of the device becomes large.

In view of these disadvantages of the conventional disperser 2, the present inventor has continuously conducted research for a disperser 2 suited for an air classifier 3. The inventor thus has developed a simple disperser 2 of a direct coupling structure. The disperser 2 utilizes an ejector effect obtainable from a high speed air flow. The disperser 2 is capable of efficiently dispersing a powder and supplying a stream of the dispersed powder directly to the supply port of a classifier 3 without any intermediate passage.

SUMMARY OF THE INVENTION

It is thus an object of the present invention to provide a powder disperser having a nozzle which is provided with a narrow discharge port for discharging a powder. A high speed air flow discharge port forms a narrow air port encompassing the outer circumference of the discharge port of the nozzle and is inwardly slanting at an acute angle relative to the discharge direction of a powder flow. A powder dispersing passage is narrowly formed on the downstream side of the nozzle either in a circular tube like shape or a radial shape along the outer wall surface continuing from the outer wall of the high speed air flow discharge port, the powder dispersing passage being connected to a powder supply port of a classifier located downstream next to the disperser. The above stated radial dispersing passage is arranged, for example, as follows: The powder flow discharge port of the nozzle is opposed to the top of a circular cone-shaped wall surface. Meanwhile, the outer wall surface of a cone shape is opposed to the side wall of the circular cone (or inner wall surface) leaving a small clearance along the side wall. The discharge port is thus formed in a narrow outward spreading shape. It is also possible to form the powder dispersing passage in a circular shape. The tip of the nozzle is opposed perpendicularly to a flat wall surface to have the powder flow discharge port formed to spread in the diametric direction of the nozzle and the above stated outer wall surface is opposed to the flat wall surface leaving a small clearance between them. In the case of such a radially shaped powder dispersing passage, the inner wall (including the flat wall) is preferably arranged to be a rotating body rotatable on the axis of the nozzle for preventing the powder particle from sticking thereto.

With the disperser arranged in this manner, the powder can be efficiently dispersed by virtue of an ejector effect of the high speed air flow. In the dispersing passage, there flows a high speed air flow along the outer wall surface to effectively prevent the particles of the powder from sticking. Further, since the dispersing passage is arranged to be connected directly to the classifier of the next stage, thus dispensing with an intermediate passage, the particles can be prevented from coagulating again and the size of the device can be reduced. It is another advantage of the invention that the degree of dispersion can be readily changed by adjusting the rate of the high speed air flow or air pressure.

The above and further objects and features of the invention will become apparent from the following detailed description of preferred embodiments thereof taken in connection with the accompanying drawings.

DETAILED DESCRIPTION OF PREFERRED EMBODIMENTS

Figure 1:
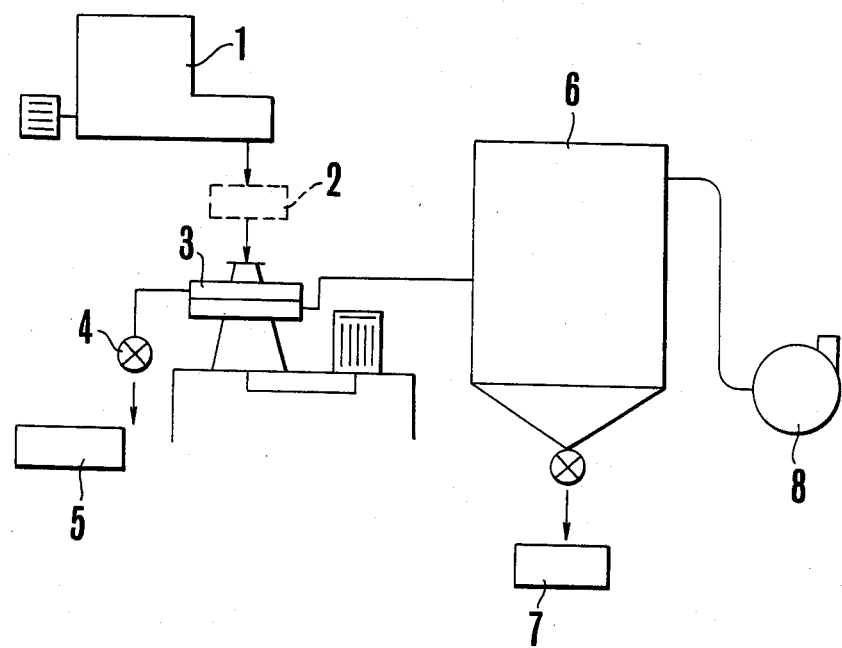
FIG. 1 is a schematic illustration showing the whole flow of operation of an air classifying system to which the present invention is applied.
Figure 2:
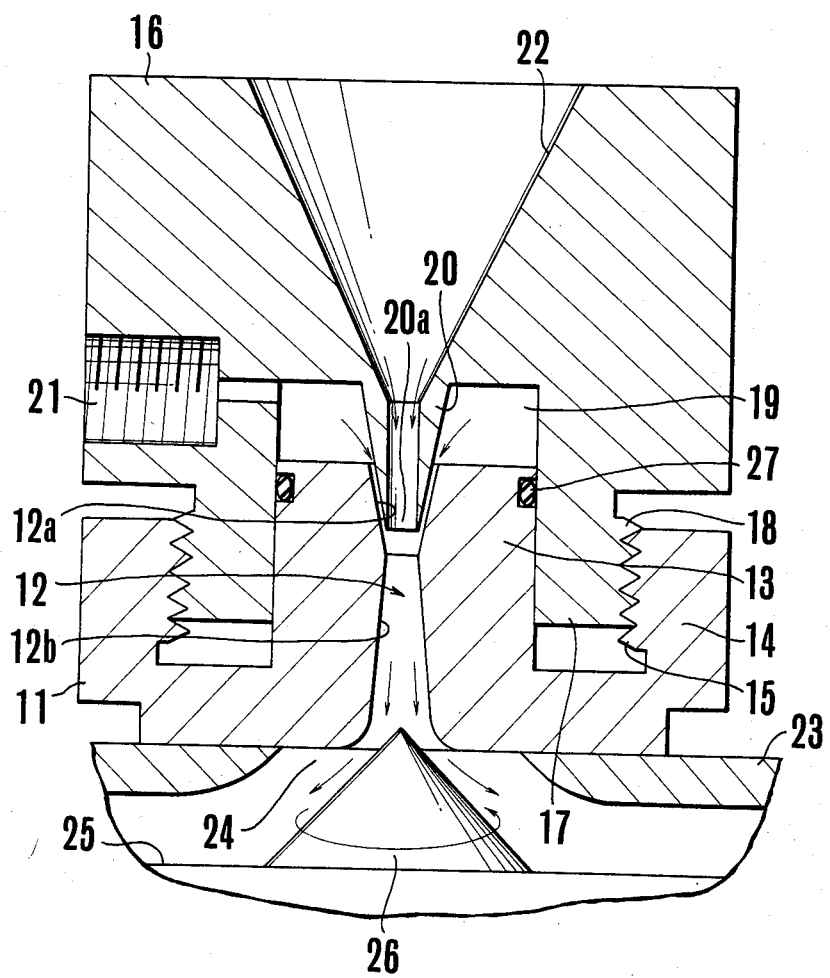
FIG. 2 is a vertical sectional view showing a disperser arranged as an embodiment of the invention.

FIG. 2 shows a disperser as an embodiment of the invention. In this case, the disperser is of the type having a powder dispersing passage arranged in a circular tube like shape. Referring to FIG. 2, a first body part 11 of the disperser is secured to the powder passage 24 of a classifier 23 by means of bolts which are not shown. A through hole 12 is formed in the middle part of the body part 11 in a vertical circular tube like shape. The upper part of the through hole 12 forms a tapered tube part 12a the diameter of which gradually increases in the upward direction. The upper tapered tube part 12a communicates via a restriction part with a lower part which forms a powder dispersing passage 12b. The powder dispersing passage 12b has its diameter gradually increase in the downward direction oppositely to the upper tapered part 12a. The first body part 11 has a female thread 15 formed in the inner circumference of an annular flange 14 which protrudes upward from the periphery of a main body part 13. A second body part 16 is arranged to be screwed into the female thread 15. The second body part 16 has a flange 17 which circularly extends downward from the lower end of the second body part 16. A male thread 18 is formed in the outer circumference of the flange 17 in such a way as to engage the female thread 15 of the first body part 11. A recess provided in the middle part of the second body part 16 is fitted on the outer circumference of the main body part 13 in an air-tight manner and thus forms a void space 19. Further, in the middle part of this recesss, there is arranged a nozzle 20 which protrudes downward to come into the tapered tube part 12a of the first body part 11. The outer circumferential wall of this nozzle 20 is arranged to have the diameter thereof gradually decrease in the downward direction in such a manner that an annular narrow passage clearance is left between the outer circumference of the nozzle 20 and the tapered tube part 12a of the first body part 11. This passage clearance thus forms an annular opening surrounding the opening of the nozzle 20 at the lower end thereof. This annular opening serves as an ejective high speed air-flow discharge port for allowing an air flow supplied from a port 21 of the second body part 16 to the void space 19 to spurt out via this discharge port. The nozzle 20 is provided with a powder passage between the lower end opening 20a and a hopper part 22 which is provided on the upper part of the nozzle 20. The hopper part 22 is arranged to receive a powder in a suitable manner from a feeder which is not shown.

The illustration of FIG. 2 further includes a rotating classifying rotor 25; a cone member 26 which is secured to the upper surface of the classifying rotor 25 and has its tip part located in the powder passage 24; and a seal ring 27.

With the powder supplied to the hopper part 22, air pressure of, for example, 3.0 kgf/cm² is supplied via the port 21. Then, a powder-air flow is supplied to the classifier 23 simultaneously with the dispersing process. At the lower end of the nozzle 20, the high speed air flow spurting out from the surrounding opening brings about an ejector effect. The powder discharged from the opening of the nozzle 20 is thus effectively dispersed. This has been proven through experiments. In the case of calcium carbonate powder, for example, the yield of a fine powder was higher with the disperser of this embodiment used than when the disperser was not used. In the case of an ultra-fine powder of aluminum oxide consisting 75% to 85% of particles not exceeding 1 μm, classification was difficult with the conventional dispersers. Whereas, with the disperser of this embodiment, the classification of the powder was satisfactorily carried out with the fine powder portion measuring less than 1 μm recovered at a high rate of yield of 98% through a continuous operation of the embodiment.

The classification accuracy value k can be expressed as k=(Dp25/Dp75), wherein Dp25 represents 25% cut size and Dp75, 75% cut size. The closer the value k to 1, the better is the classification accuracy. In the case of the disperser of this embodiment, the value k increased from 0.52 to 0.60.

These advantages are believed to be attributable to the arrangement that the stream of powder passing through the disperser is arranged to come directly into the classifier 23 without passing through any intermediate passage and also that the powder is prevented from sticking to wall surfaces at the powder passage 24, etc. Further advantages of the disperser of this embodiment include the simple and compact structural arrangement which facilitates installation and the ejective arrangement which lessens the effect of load variation occurring on the side of the powder supply.

Further, the diameter and spurting out direction of the high speed air flow discharge port encompassing the opening of the nozzle 20, the length and shape of the powder dispersing passage can be determined according to the properties and processing volume of the powder. Generally, however, the spurting out direction is preferably at an acute angle not exceeding 45° downward relative to the direction in which the powder is discharged from the nozzle 20. It is particularly effective for preventing the sticking of powder to the wall surface to have the spurting-out direction as close to the powder discharging direction as possible.

Figure 3:
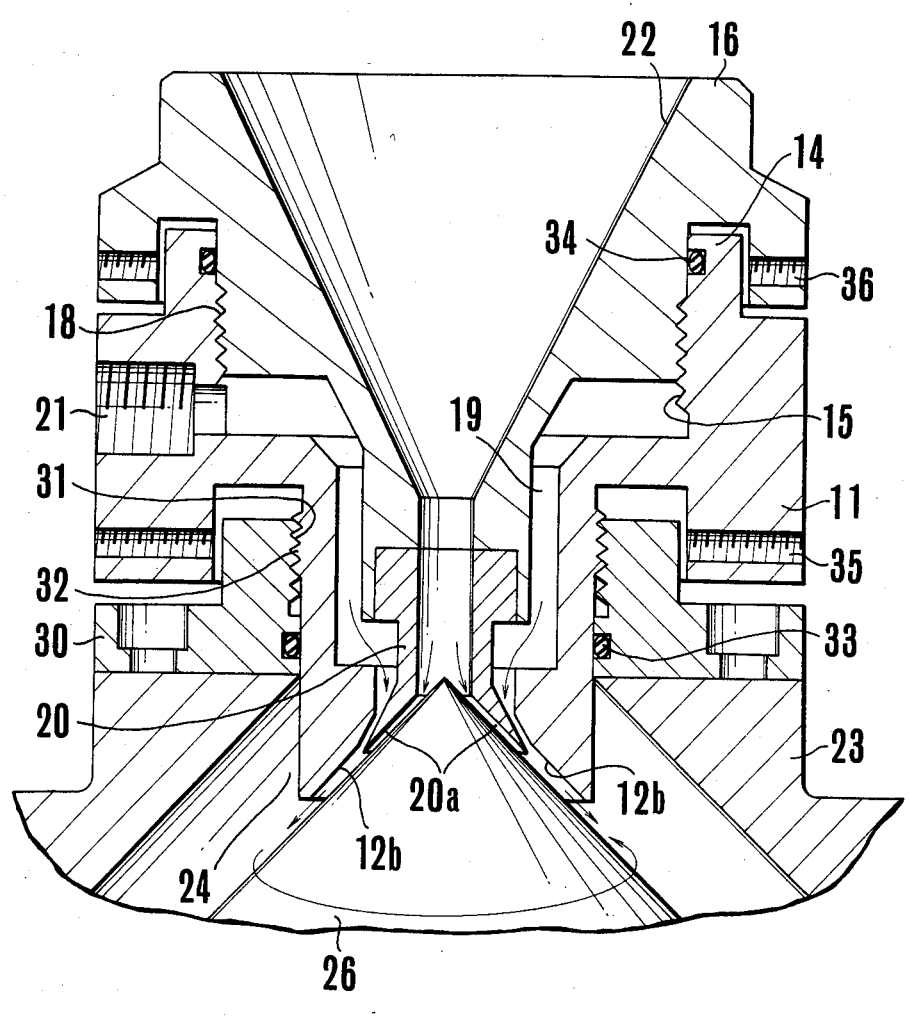
FIG. 3 is a vertical sectional view showing a disperser as another embodiment of the invention.

Another embodiment is arranged as shown in FIG. 3. In this example, the powder dispersing passage of FIG. 2 is improved by arranging it to extend into the inside of the classifier 23. This arrangement further lessens the possibility of recoagulation of the powder particles after dispersion and further enhances the dispersion efficiency. In FIG. 3, the members and parts performing the same functions as those of corresponding parts of FIG. 2 are denoted with the same reference numerals. This embodiment of FIG. 3 differs from the example of FIG. 2 in the following two points: The first body part 11 is not directly secured to the classifier 23 but is indirectly connected thereto via screwed engagement with a fixed disc 30. The arrangement is such that the first body part 11 permits fine adjustment in the upward and downward directions relative to the classifier 23. The nozzle 20 is separately attached to the lower end of the second body part 16. The lower end of the nozzle 20 forms a conical inner surface spreading outward. A radial powder discharge port is thus formed between the lower end of the nozzle 20 and the surface of a conical member 26 disposed within the classifier 23. Accordingly, the first body part 11 forms a powder dispersing passage 12b in an outward spreading shape extending downward in conjunction with the above stated conical member 26. With the exception of these points, the example shown in FIG. 3 is substantially identical with the preceding example shown in FIG. 2.

Referring further to FIG. 3, a female thread 31 is formed in the disc 30. The first body part 11 is provided with a male thread 32 which is arranged to be screwed in engagement with the female thread 31 to permit vertical position adjustment. By virtue of this arrangement, the extent of clearance between the disperser and the conical member 26 within the classifier 23 can be adjusted as desired. Reference numerals 33 and 34 denote seal rings and 35 and 36 holes for set bolts.

With the disperser arranged as described above, the same advantageous effects are attainable as in the case of the preceding example shown in FIG. 2. In the case of FIG. 3, the arrangement of the powder dispersing passage 12b substantially disposed within the classifier 23 furthers the dispersing effect attainable.

The powder disperser arranged according to the present invention as a pretreatment device for an air classifier is compactly arranged and gives various advantages as described in the foregoing specification. The practical utility of the invention is extremely great.

What we claim is:

1. In an air-operated system for separating a powder having:
   a powder feeder;
   a classifier having a deflector arranged therein and being positioned below the powder feeder;
   means, arranged at one side of the classifier, for recovering coarse portions of the powder;
   means, arranged at another side of the classifier, for recovering fine portions of the powder; and
   a disperser, positioned between the powder feeder and the classifier, for receiving powder from the powder feeder and for dispersing the powder into the classifier;
   the improvement comprising:
   said disperser including
      a first body part being connected to the classifier and having first mating means;
      a second body part being arranged under the powder feeder and having second mating means;
      said first mating means on the first body part and said second mating means on the second body part engaging with each other so as to permit fine adjustment of the second body part relative to the classifier in upward and downward directions;
      nozzle means, being arranged in the second body part and having a narrow discharge port with a funnel diverging over the deflector, for receiving powder from the powder feeder;
      a passage extending through the first body part and receiving therein the narrow discharge port of the nozzle means;
      a high speed air flow discharge port being arranged in said passage and having a narrow air opening diverging directly over the deflector between an outer circumference of the narrow discharge port of the nozzle means and an inner wall of the passage;
      a fixed disc surrounding the port means of the classifier and having third mating means;
      said first body part having fourth mating means;
      said third mating means on the fixed disc and said fourth mating means on the first body part engaging with each other so as to permit fine adjustment of the first body part relative to the classifier in upward and downward directions;
   said classifier including
      port means, arranged in an upper end of the classifier in communication with a lower end of the passage extending through the first body part of the disperser, for receiving powder for dispersing into the classifier;
      said narrow discharge port of the nozzle means, said high speed air flow discharge port, and said passage all being positioned directly over one another and over the deflector inside the port means of the classifier;
      whereby the disperser is vertically adjustably mounted on the classifier so that the narrow air opening of the high speed air flow discharge port may be finely adjusted, depending upon the powder to be separated.

* * * * *